United States Patent Office 3,322,985
Patented May 30, 1967

3,322,985
GAS-COOLED ROTOR OF ELECTRIC GENERATOR
Jury Ivanovich Azbukin, Seliverstov pereulok 16, kv. 85, Moscow; Nikolai Mikhailovich Portnov, St. Malakhovka, ulitsa Sverdlova, 13, Moskovskaya Oblast; Vladimir Jurievich Avrukh, Ozernaya ulitsa, 24, kv. 25, Moscow; Vladimir Dmitrievich Kozorezov, Reutovo, ulitsa Gagarina, 7, Moskovskaya Oblast; and Mikhail Isaakovich Mitelman, Lomonosovsky prospect 23, kv. 400, Moscow, all of U.S.S.R.
Filed May 5, 1965, Ser. No. 453,283
6 Claims. (Cl. 310—61)

The present invention relates to dynamoelectric machines, and more particularly, to methods of cooling the end turns of the rotor winding of a turbogenerator having two, four and more poles.

There are known designs of dynamoelectric machine rotors whose rotor winding end turns are cooled by a system of ventilation passages between the side surfaces of the rotor winding coils and the adjacent insulating spacers. In these known rotors the cooling gas flows either along the said systems of ventilation passages, or along the curved and straight sections of the end turn of the rotor winding, or in a radial direction (in respect to the longitudinal axis of the rotor), the cooling gas being discharged in the last instance through some form of exhaust openings in the retainer ring that prevents displacement of the end rotor winding turns under the action of centrifugal forces.

The rotors mentioned above have marked shortcomings, consisting in the following:

(a) The impossibility of providing intensive ventilation of considerable side surfaces of the coils owing to the reduction in this instance of the surface areas used to secure all the turns of the coils in respect to each other by means of insulating spacer members, which is done to prevent displacement of the end rotor winding turns due to the action of forces induced by temperature strains, and short circuits in the generator. Such spacer members are termed "cleats" when they are in the form of a wedge and installed between the straight sections of the end turns of the rotor winding. The insulating members installed between the curved sections of the end rotor winding turns are of rectangular cross-section and will be termed "spacers" or "insulating spacers."

(b) A reduction in the strength of the retainer rings (bands) owing to the presence of some kind of discharge openings.

Additionally, dynamoelectric machine rotors are known whose end winding turns are cooled by circulation of a gas inside hollow box-section conductors. In this instance the use of slot conductors with a box-shaped section in the end turns results in a reduction of the total number of turns in the rotor winding coil owing to the large size of such a turn in comparison with the generally used solid turn, this leading to an increase in the rotor current and, therefore, requiring powerful exciting systems.

An object of the present invention is to eliminate such disadvantages.

A particular object of the invention is to provide an electric generator rotor which is simple in design, and which provides effective cooling of the winding front part.

These and other objects of the present invention are obtained by the electric generator rotor according to the invention with intercoil insulation cleats and spacers which are installed in the front part of the winding, said front part of the rotor winding having spiral systems of ventilation passages through which the cooling gas is allowed to circulate. The spiral system of ventilation passages can be formed by inclined grooves on the side surfaces of the insulating cleats and spacers and by transverse slots in the said cleats and spacers so that the cooling gas flows around the cleats or spacers along a spiral or helical path. The spiral system of ventilation passages can be formed by inclined grooves on the side surfaces of the conductors in the end turn of the rotor winding and by the transverse slots in the said conductors, cleats and spacers so that the cooling gas flows consecutively around the conductors and cleats or the conductors and spacers along a spiral line.

Other objects and advantages of this invention will be more apparent from the following description with reference to the appended drawings, wherein.

Figure 1:
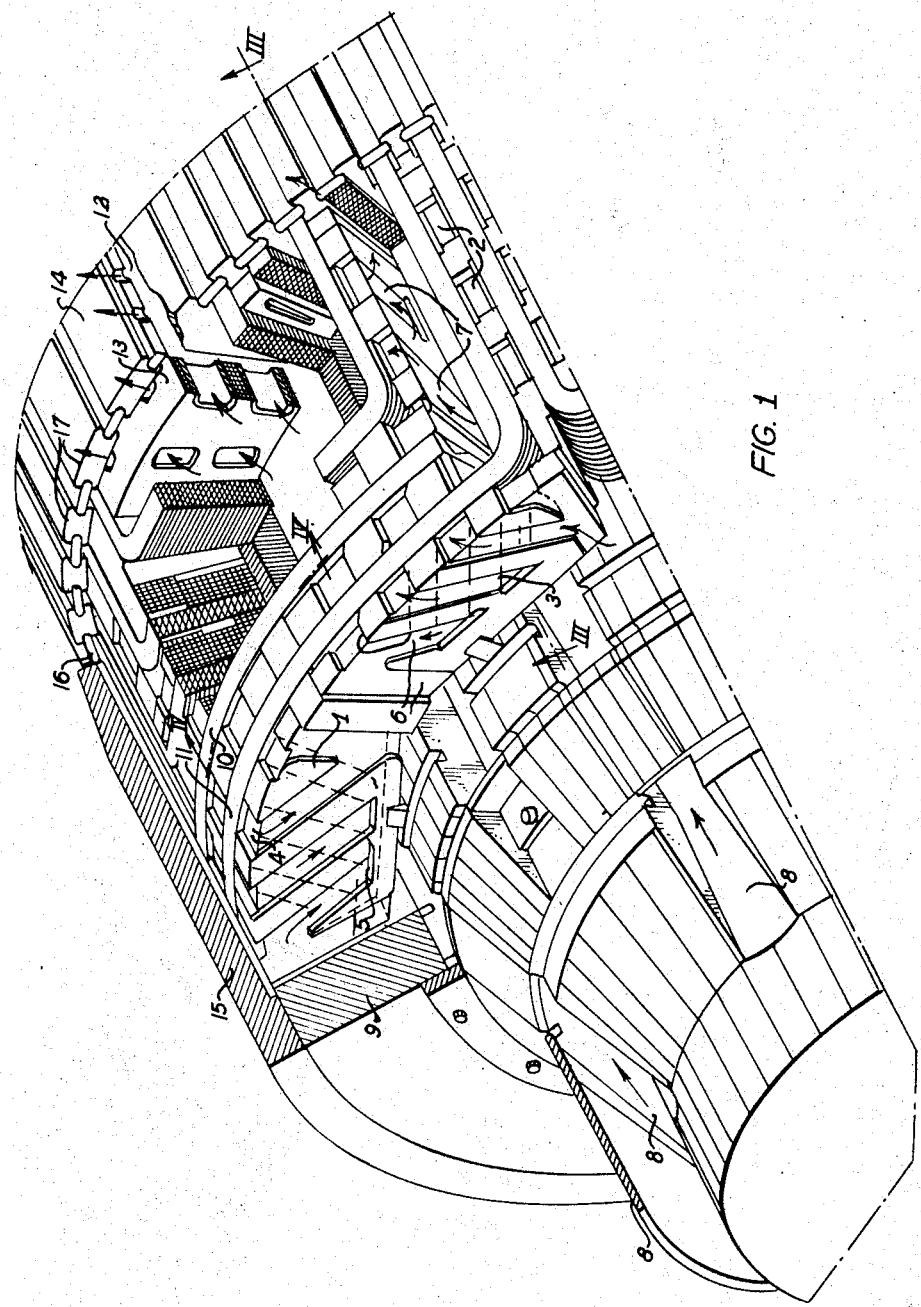
FIG. 1 shows the front part of the electric generator rotor winding with the spiral system of ventilation passages formed by inclined grooves in the cleats and spacers.

Cut in insulation spacers 1 and cleats 2 of the turbogenerator rotor (FIG. 1) are inclined grooves 3 which, along with lateral grooves 4 and 5 formed at the top and bottom of said spacers and cleats, constitute a spiral system of ventilation passages 6 and 7. By self-ventilation, a cooling gas passes through intake groove 8, arranged beneath centering ring 9, and divides into two parallel streams. One of said streams runs through spiral system of ventilation passages 6, cools the side surfaces of adjacent coils 10 and 11 on the arcuate or curved regions of the winding front part, and enters the air gap of the generator via ventilation passages 12 formed in central cleat 13 and an unslotted pole center portion 14 of the rotor. The other stream of cooling gas moves along the spiral system of ventilation passages 7, under retainer ring 15, cools side surfaces (straight areas) of adjacent coils 10 and 11 of the front part of the winding, and enters the generator clearance through gap 16 between the nose of retainer ring 15 and end face of rotor core 17.

As shown in the appended figures, the discharge of the cooling gas can be also effected through special openings or slots in the teeth of the central rotor part or co-ordinated in one way or another with the cooling system of the central part of the rotor winding lying in the grooves.

Figure 2:
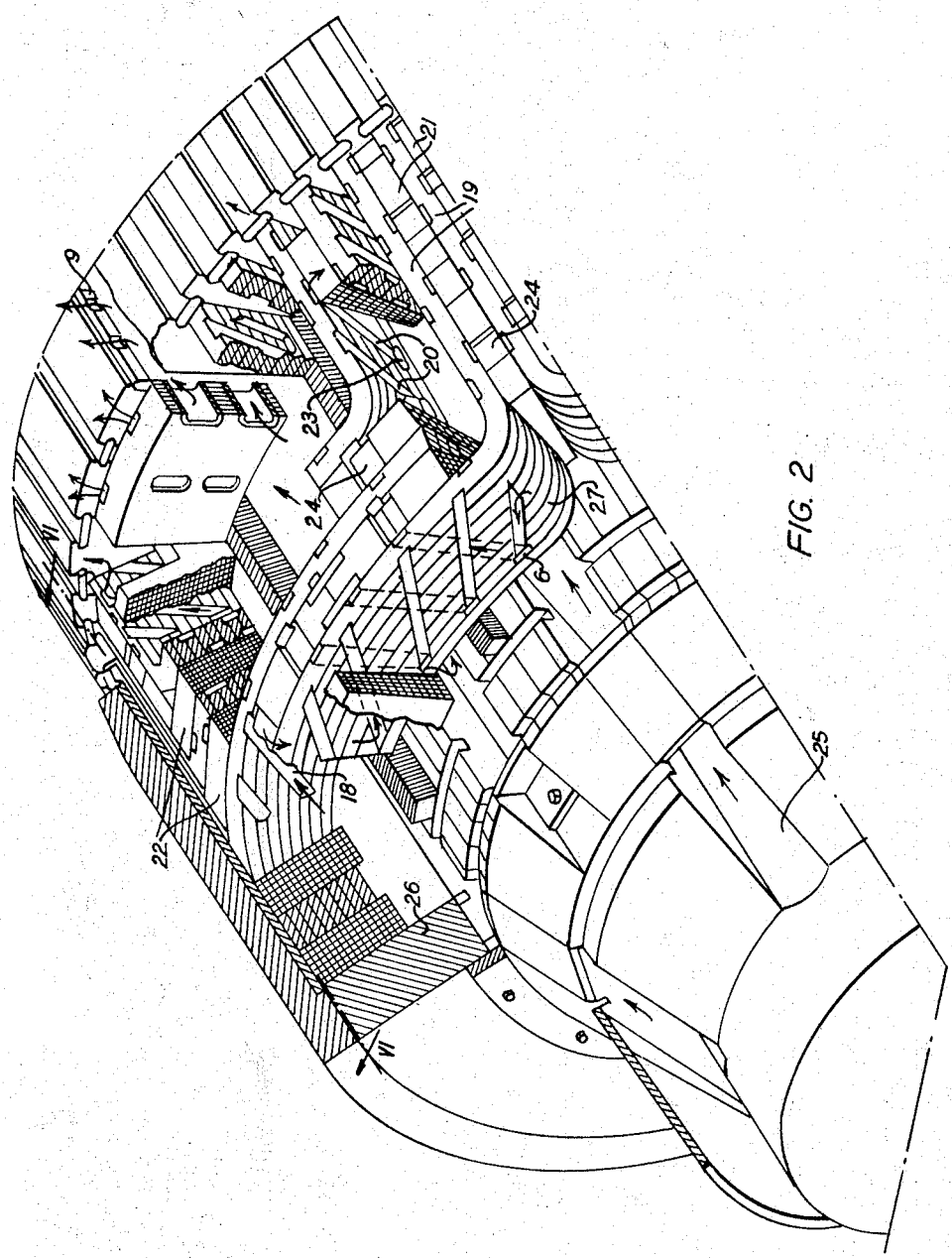
FIG. 2 shows the front part of the rotor winding with the spiral system of ventilation passages formed by inclined grooves in the cleats and spacers.

The ventilation passages may be formed by inclined grooves 18 in the arcuate regions of the end turns of the rotor winding coils 19 (FIG. 2), and inclined grooves 20 in the side surfaces of said coils 19, said grooves 18 and 20 being appropriately positioned relative to insulation cleats 21 and spacers 22. Inclined passages 20 are cut in the side surfaces of coils 19 so that each passage extends to the opposite side of the coil where it is connected at the bottom to lateral groove 23 machined in the lower turn of coil 19, thus forming V-, N-, and W-shaped passages. In order to bypass the cooling gas from one coil to the other, lateral grooves 24 are provided at the top of insulation cleats 21 and of spacers 22. Owing to self-ventilation, the cooling gas passes through intake groove 25 under centering ring 26 and divides into two parallel streams. One stream of the gas moves along inclined grooves 20 formed in coils 19 and cools the straight sections of the front parts of coils 19, whereas the other stream runs through similar inclined grooves 18 and cools the arcuate region of the front parts of said coils. Intake of the cooling gas into inclined grooves 18 and 20 is effected at the corners of coils 19.

With passages made in the side surfaces of insulation cleats 2 and spacers 1 (FIG. 1), the gas flows from the corners of coils 10 and 11 to the end face of rotor core 17 and cools the side surfaces of coils adjacent to cleat 2 or spacer 1.

If the ventilation passages are made in the copper of the winding, the cooling gas flows in V-, N-, and W-shaped passages (FIG. 2) cut in the side surfaces of coils 19, and is bypassed through respective grooves 24 made in cleats 21 or in spacers 22, and in lower turn 27 of coils 19.

Figure 3:
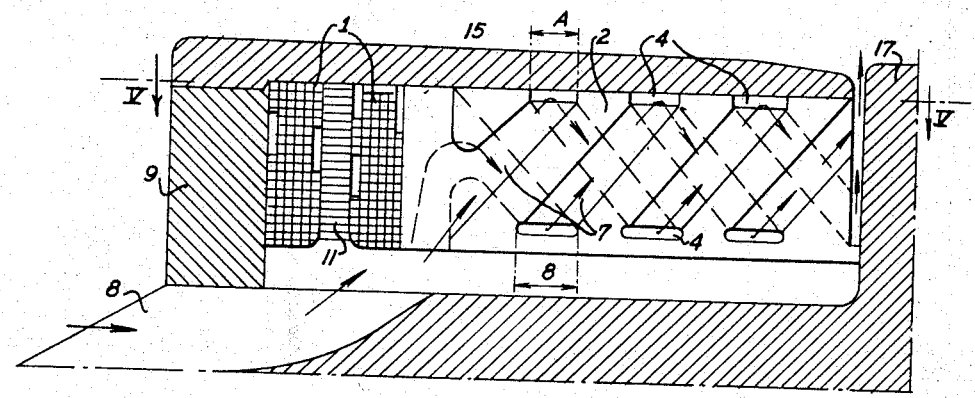
FIG. 3 is a section taken along line III—III in FIG. 1.

The spiral motion of cooling gas in the straight area of the rotor winding front part (FIG. 3) is realized through intake groove 8 located under centering ring 9. Then the gas enters ventilation passages 7 cut in insulation cleats 2. From one side of cleat 2 to the other the gas is bypassed through lateral grooves 4 made at the top and bottom of cleat 2. In this case, the gas escapes into the gap between retainer ring 15 and rotor core 17.

Figure 4:
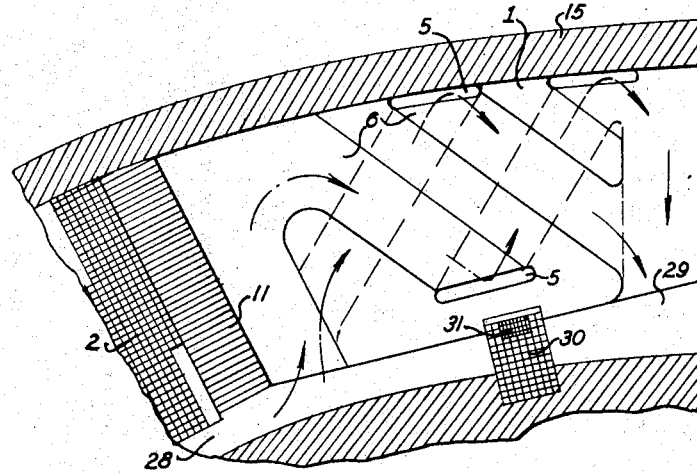
FIG. 4 is a section taken along line IV—IV in FIG. 1.
Figure 5:
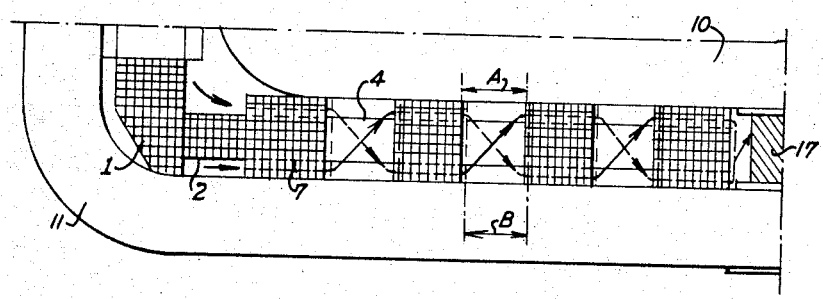
FIGURE 5 is a cross-section taken along line V—V in FIG. 3.
Figure 6:
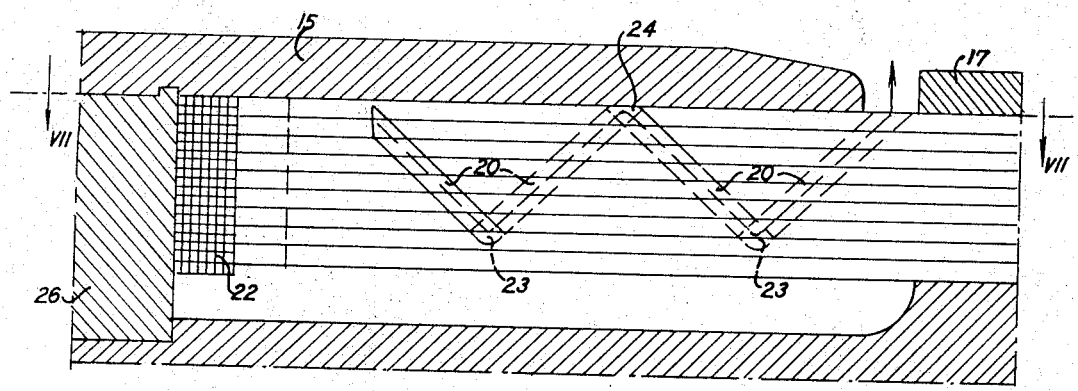
FIGURE 6 is a cross-section taken along line VI—VI in FIG. 2.
Figure 7:
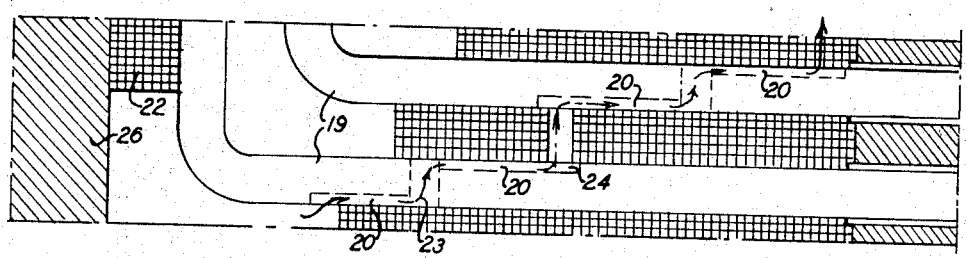
FIGURE 7 is a cross-section taken along line VII—VII in FIG. 6.

FIG. 4 illustrates the direction of gas flow in the arcuate zone of the rotor winding. The gas enters ventilation passages 6 cut in insulation spacer 1 and then flows through lateral grooves 4 and 5 which, together with retainer ring 15 and ventilation passages 6, form a spiral trajectory.

To insure an adequate gas flow through these passages, gas intake zone 28 and gas outlet zone 29 are separated from one another with longitudinal insulation plates 30 and packing glands 31.

Although the present invention has been described according to the preferred embodiment thereof, various modifications and alterations may be made without departing from the scope and spirit of that invention, as those skilled in the art will easily understand. Such alterations and modifications are to be considered as falling within the scope of the invention as defined in the appended claims.

What is claimed is:

1. A rotor of a dynamoelectric machine comprising a rotor core with slots distributed along its circumference; a plurality of windings arranged in said slots and having end turns extending axially beyond the slots; and insulating cleats and spacers between said end turns of adjacent windings, said windings, cleats and spacers defining intercommunicating grooves which provide a spiral system of ventilation passages for circulation of the cooling gas around the end turns of said windings.

2. A rotor of a dynamoelectric machine comprising a rotor core with slots, a plurality of windings arranged in said slots and having end turns, insulating cleats and spacers between said end turns of adjacent windings, and means defining a spiral system of ventilation passages constituted by inclined grooves on the side surfaces of the insulating cleats and spacers, and transverse slots in said cleats and spacers, so that a cooling gas flows around the insulating cleats and spacers along a spiral path to cool the end turns of said windings.

3. A rotor of a dynamoelectric machine comprising a rotor core with slots, a plurality of windings in said slots with end turns, said windings each including a plurality of conductors, insulating cleats and spacers between the end turns of adjacent windings; means defining a spiral system of ventilation passages constituted by inclined grooves on the side surface of the conductors at said end turns and by transverse slots in said conductors and the insulating cleats and spacers, so that cooling gas flows consecutively around the said cleats, conductors and spacers along a spiral path.

4. A rotor of a dynamoelectric machine comprising a rotor core, a set of rotor winding members with end turns on said core, and a set of insulating members between the end turns of adjacent winding members, at least one of said sets of members being provided with intercommunicating grooves defining a spiral system of ventilation passages in said members, so that the said passages form V, N and W-shaped paths for the flow of a cooling gas.

5. A rotor as claimed in claim 4 wherein said passages are formed in said winding members in the side surfaces thereof.

6. A rotor as claimed in claim 4 wherein said passages are formed in said insulating members.

References Cited

UNITED STATES PATENTS

| | | | |
|---|---|---|---|
| 1,819,860 | 8/1931 | Belfils | 310—61 |
| 1,927,890 | 9/1933 | Fechheimer | 310—61 |
| 2,459,586 | 1/1949 | Ross | 310—61 |
| 2,653,255 | 9/1953 | Baudry et al. | 310—64 |
| 2,796,540 | 6/1957 | Barlow | 310—64 |
| 2,833,944 | 5/1958 | Willyoung | 310—61 |
| 2,844,746 | 7/1958 | Coggeshall | 310—270 |
| 3,005,119 | 10/1961 | Schmitt et al. | 310—61 |

MILTON O. HIRSHFIELD, *Primary Examiner.*

ORIS L. RADER, *Examiner.*

L. L. SMITH, *Assistant Examiner.*